United States Patent
Smolorz

(10) Patent No.: US 10,038,946 B2
(45) Date of Patent: Jul. 31, 2018

(54) OPTICAL NETWORK AND METHOD FOR PROCESSING DATA IN AN OPTICAL NETWORK

(71) Applicant: Xieon Networks S.a.r.l., Luxembourg (LU)

(72) Inventor: Sylvia Smolorz, Mountain View, CA (US)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 14/474,936

(22) Filed: Sep. 2, 2014

(65) Prior Publication Data
US 2014/0369683 A1    Dec. 18, 2014

Related U.S. Application Data

(63) Continuation of application No. 13/502,177, filed as application No. PCT/EP2009/063591 on Oct. 16, 2009, now Pat. No. 8,934,771.

(51) Int. Cl.
*H04B 10/20* (2006.01)
*H04Q 11/00* (2006.01)
(Continued)

(52) U.S. Cl.
CPC ..... *H04Q 11/0067* (2013.01); *H04B 10/2581* (2013.01); *H04B 10/27* (2013.01); *H04Q 2011/009* (2013.01); *H04Q 2011/0081* (2013.01); *H04Q 2011/0092* (2013.01); *H04Q 2011/0096* (2013.01)

(58) Field of Classification Search
USPC ....................................... 398/58, 59
See application file for complete search history.

(56) References Cited

U.S. PATENT DOCUMENTS

| | | | |
|---|---|---|---|
| 6,681,083 B1 * | 1/2004 | Koonen | H04J 14/0283 398/165 |
| 6,907,159 B1 * | 6/2005 | Daniel | H04J 14/0219 385/16 |

(Continued)

FOREIGN PATENT DOCUMENTS

| | | | |
|---|---|---|---|
| EP | 1128585 A2 | 8/2001 | |
| EP | 1505753 A2 | 2/2005 | |
| WO | WO 2008034927 A1 * | 3/2008 | .......... H04J 14/0201 |

OTHER PUBLICATIONS

Yim, Jae-Nam et al., "Ultra-Dense Wdm Pon with 12.5-GHz Speced 256 Channels," Journal of the Optical Society of Korea, vol. 12(4):351-354 (2008).

(Continued)

*Primary Examiner* — David Payne
*Assistant Examiner* — Pranesh Barua
(74) *Attorney, Agent, or Firm* — Nelson Mullins Riley & Scarborough LLP

(57) ABSTRACT

An optical network has an optical line termination coupled to a backbone network, in particular to an optical long haul network and a local exchange coupled to an optical access network. The local exchange provides an optical connection between an optical network unit of a tree topology and the optical line termination, which is part of a ring topology. There is also described a method for processing data in such an optical network.

15 Claims, 3 Drawing Sheets

(51) Int. Cl.
*H04B 10/2581* (2013.01)
*H04B 10/27* (2013.01)

(56) References Cited

U.S. PATENT DOCUMENTS

| | | | |
|---|---|---|---|
| 7,120,359 B2* | 10/2006 | Way | G02F 1/0356 |
| | | | 398/1 |
| 7,272,321 B1 | 9/2007 | Kuo et al. | |
| 7,369,769 B2 | 5/2008 | Yang et al. | |
| 7,778,543 B2 | 8/2010 | Ferguson et al. | |
| 8,090,256 B2 | 1/2012 | Reisslein et al. | |
| 2001/0017722 A1* | 8/2001 | Takachio | H04B 10/271 |
| | | | 398/79 |
| 2002/0181037 A1* | 12/2002 | Lauder | H04B 10/032 |
| | | | 398/3 |
| 2004/0008404 A1* | 1/2004 | Aoki | H04B 10/2916 |
| | | | 359/334 |
| 2005/0031348 A1 | 2/2005 | Choi et al. | |
| 2005/0088964 A1 | 4/2005 | Yang et al. | |
| 2005/0158047 A1 | 7/2005 | Way et al. | |
| 2005/0158057 A1* | 7/2005 | Tomofuji | H04B 10/0775 |
| | | | 398/160 |
| 2006/0146855 A1* | 7/2006 | Kani | H04J 14/0226 |
| | | | 370/430 |
| 2006/0147219 A1* | 7/2006 | Yoshino | H04B 10/548 |
| | | | 398/183 |
| 2006/0269295 A1 | 11/2006 | Way | |
| 2006/0275035 A1* | 12/2006 | Way | H04B 10/27 |
| | | | 398/59 |
| 2007/0077073 A1* | 4/2007 | Shimada | H04B 10/296 |
| | | | 398/158 |
| 2007/0086332 A1* | 4/2007 | Way | H04J 3/14 |
| | | | 370/223 |
| 2008/0002978 A1* | 1/2008 | Onaka | H04J 14/0212 |
| | | | 398/81 |
| 2008/0013950 A1 | 1/2008 | Boudreault et al. | |
| 2008/0145051 A1* | 6/2008 | Wellbrock | H04B 10/271 |
| | | | 398/59 |
| 2009/0022489 A1 | 1/2009 | Way | |
| 2009/0092389 A1* | 4/2009 | Wei | H04J 14/0241 |
| | | | 398/59 |
| 2009/0208211 A1 | 8/2009 | Tamai | |
| 2009/0252492 A1 | 10/2009 | Sone et al. | |
| 2009/0290873 A1 | 11/2009 | Takita et al. | |
| 2009/0317083 A1* | 12/2009 | Prat Goma; Josep | H04J 14/0201 |
| | | | 398/68 |
| 2010/0054735 A1 | 3/2010 | Wei et al. | |
| 2010/0260496 A1* | 10/2010 | Tosetti | H04B 10/2587 |
| | | | 398/7 |
| 2011/0064409 A1 | 3/2011 | Grobe | |
| 2011/0064412 A1 | 3/2011 | Claringburn et al. | |
| 2012/0195588 A1 | 8/2012 | Way | |
| 2012/0207477 A1* | 8/2012 | Takeguchi | H04J 14/0204 |
| | | | 398/79 |
| 2012/0263470 A1* | 10/2012 | Schmidt | H04J 14/0227 |
| | | | 398/72 |
| 2014/0010555 A1 | 1/2014 | Lentz et al. | |

OTHER PUBLICATIONS

International Search Report for Application No. PCT/EP2009/063591, 3 pp., dated Sep. 23, 2010.

European Search Report, EP15155070.4, dated Jun. 17, 2015, pp. 1-8.

Prat, J. et al., "Passive Oadm network element for hybrid ring-tree Wdm/Tdm-Pon," Optical Communication, 2009, Ecoc '09, 35TH European Conference on, IEEE, Piscataway, Nj, Usa, Sep. 20, 2009, pp. 1-2, XP031546481.

Baptista, a., et al., "Improved remote node configuration for passive ring-tree architectures," ECOC2008, Ecoc, Brussels, 21-25 Sep 2008, Ecoc, Brussels Expo, Belgium, Sep. 21, 2008, pp. 1-2, XP001524804.

\* cited by examiner

OPTICAL NETWORK AND METHOD FOR PROCESSING DATA IN AN OPTICAL NETWORK

CROSS REFERENCE TO RELATED APPLICATIONS

The present application is a continuation application of U.S. patent application Ser. No. 13/502,177, filed Apr. 25, 2012, which is a National Stage of PCT/EP2009/063591, filed on Oct. 16, 2009, all of which are incorporated herein by reference in their entirety.

The invention relates to an optical network and to a method for processing data in an optical network.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Conventional PONS distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., a coherent Ultra-Dense Wavelength Division Multiplex (UDWDM) network, are deemed to be the future data access technology.

Within the UDWDM concept, potentially all wavelengths are routed to each ONU. The respective wavelength is selected by the tuning of the local oscillator (LO) laser at the ONU. The selected wavelength is unique to each ONU at any point in time, corresponding to the channel that is assigned to this ONU. Since the wavelength, which is used for communication from the ONU to the OLT (the upstream wavelength), is derived from this selected wavelength (the downstream wavelength), the upstream wavelength is also unique to the ONU and no interference at the OLT occurs between channels assigned to different ONUs.

Today's communication networks are separated into a long haul (LH) segment, typically using dense wavelength division multiplexing (DWDM), metro networks, often using coarse wavelength multiplexing (CWDM), and access networks, which rely on DSL or passive optical networks.

The LH network is a meshed network, the metro network is a ring network, and the access network has a tree topology. Each segment uses specific technology and components. Interfaces between these networks require optical-electrical-optical (OEO) conversion.

FIG. 1 shows such a commonly used network structure. A long haul network termination 101 is connected to a carrier Ethernet switch CET 102, wherein such connection is used for conveying electrical signals. Hence, the long haul network termination 101 provides a conversion from optical to electrical signals and the CET 102 provides a conversion from electrical to optical signals, said optical signals being fed to a Gigabit Ethernet ring network 103 comprising 8 CWDM channels. For each such CWDM channel one DSLAM 104 to 111 is connected to the optical ring network 103. Considering for example DSLAM 105, several subscribers 112 to 114 are connected to this DSLAM 105, which is equipped with a filter that allows the DSLAM 105 to receive and to transmit on one of 8 CWDM wavelengths only. The DSLAM 105 further comprises a light source that generates light on the matching wavelength. Data is modulated onto this light and it is transmitted to the CET 102. Here, the light is converted into electrical data, conveyed to the long haul network termination 101 and then converted into light again. The uplink is redundant; the data is sent both clockwise and counterclockwise through the ring network 103.

In downstream direction (towards the subscriber), the CET 102 determines the correct wavelength to use for the particular DSLAM to which the subscriber of the data is connected to.

This architecture provides eight protected Gigabit Ethernet channels per fiber pair, even though these fibers could transport several terabits of information. Each DSLAM is equipped with a dedicated filter card; hence, the network is rather inflexible and cannot easily be re-configured. It is also a disadvantage of such a solution that the network cannot easily be adjusted to emerging traffic, because the filters of the DSLAMs would have to be replaced in case additional wavelengths are introduced. Furthermore, only a limited number of DSLAMs can be connected to a single ring topology; hence several rings are needed in order to supply a higher number of DSLAMs. This results in a costly and complex structure.

The problem to be solved is to overcome the disadvantages stated above and in particular to provide an efficient and flexible solution to supply subscribers at least partially via an optical network.

This problem is solved according to the features of the independent claims. Further embodiments result from the depending claims.

In order to overcome this problem, an optical network is provided
  comprising an optical line termination coupled to a backbone network, in particular to an optical long haul network;
  comprising a local exchange coupled to an optical access network, wherein said local exchange provides an optical connection between an optical network unit of a tree topology and the optical line termination, which is part of a ring topology.

It is noted that the optical line termination may be any device to be coupled with the backbone network, wherein such coupling may be via an electrical and/or an optical connection.

It is further noted that the backbone network may be an optical or an electrical network, in particular an optical long haul network.

The local exchange may be regarded as "colorless", i.e. it is not pre-defined to fit a particular wavelength or a selection of wavelengths (only).

The local exchange may be any means that couples said optical network with an access network in the optical domain.

Advantageously, this approach allows for only a single optical-electrical-optical conversion at the interface between the backbone network and the optical line termination.

As an option, the optical line termination may be deployed at or associated with a central office that is connected to the backbone network.

In an embodiment, the optical access network is a passive optical network to which several optical network units are connectable.

The optical access network may have a tree topology with a bi-directional single fiber that is attached to, e.g., a ring topology of the optical network.

In another embodiment, the optical network is an UDWDM network.

In a further embodiment, said local exchange comprises means to convert upstream and downstream traffic conveyed via separate fibers to upstream and downstream traffic conveyed via a single fiber and/or vice versa.

It is noted that upstream direction refers to signals or traffic conveyed from the subscribers or ONUs towards the OLT or backbone network and downstream refers to the opposite direction towards the subscribers or ONUs.

Hence, the local exchange may in particular comprise means for converting upstream and downstream traffic being conveyed via separate fibers to/from one single fiber to be connected to the optical access network, in particular the PON to which the subscribers, e.g., ONUs, are attached.

In a next embodiment, said means to convert upstream and downstream traffic comprises a circulator.

It is also an embodiment that the optical network comprises a ring topology that is connected via the optical line termination to the backbone network and via the local exchange to the access network.

The ring topology provides the advantage that two paths (directions of the ring) could be utilized in order to reach a component that is connected to the ring. These paths could be referred to as active path and as protection path. In an exemplary configuration of the ring topology, upstream and/or downstream traffic may—by default—be sent via both paths of the ring topology. Preferably, with regard to the downstream traffic, the local exchange may either convey the traffic of the active path or the traffic of the protection path towards the subscribers attached to the local exchange. This can be achieved, e.g., by controlled optical attenuators, which can be switched on or off.

Pursuant to another embodiment, the ring topology comprises an active path and a protection path.

According to an embodiment, in downstream direction, signals from the active or from the protection path are fed towards the optical network units.

According to another embodiment, the downstream signals are branched off (from the ring topology) via an adjustable coupler.

The adjustable couplers may be controlled such that they branch off the amount of light required for further processing in or toward the access network. The adjustable coupler may even consider the position of the local exchange within the ring topology and therefore adjust the amount of light branched off depending on the actual attenuation the light has experienced when reaching this particular local exchange.

In yet another embodiment, the local exchange comprises a controlled attenuator that selects signals in downstream direction from the active or from the protection path.

It is noted that such selecting could be switching signals, e.g., either conveying signals from the active or from the protection path.

Said controlled attenuator may be a variable optical attenuator. It may comprise a monitoring capability, e.g., monitoring light sensors (diodes), that could detect a loss of light (power) and may initiate a local switching to the respective other path even without intervention from a central ring component such as the optical network termination.

According to a next embodiment, in upstream direction, signals are fed into the ring topology in both directions of the ring topology.

The optical network termination may hence obtain redundant signals fed to the ring.

Optionally, the upstream signals may be fed into the ring topology utilizing adjustable couplers in order to (at least partially) compensate an attenuation the light experiences when travelling along the ring topology in different directions. Hence, the upstream signals may be fed into the ring topology using different directions and different levels of light thereby adjusting the energy split depending on the way the light has to travel in the ring before it reaches the optical line termination.

Pursuant to yet an embodiment, the optical network replaces or is provided to replace a metro network.

The problem mentioned above is also solved by a method for processing data in the optical network according to any of the preceding claims.

In addition, the problem is solved by a method for processing data in an optical network,
  comprising an optical line termination coupled to a backbone network, in particular to an optical long haul network and a local exchange to be coupled to an optical access network,
  wherein said local exchange converts upstream and downstream traffic conveyed via separate fibers to upstream and downstream traffic conveyed via a single fiber and/or vice versa.
  According to an embodiment, the local exchange
  selects signals in downstream direction from the active or from the protection path and/or
  branches off downstream signals via an adjustable coupler thereby adjusting the power of these signals and/or
  conveys upstream signals towards the optical line termination via an adjustable coupler thereby adjusting the power of these signals.

Embodiments of the invention are shown and illustrated in the following figures:

The solution presented in particular suggests providing a network using UDWDM instead of the CWDM-metro network and the DSL access networks.

This UDWDM network can in particular handle distances up to 100 km and hundreds of Gigabit Ethernet (GE)

channels, it does also not require a separated metro network to get connected to the long haul (LH) network. Since wavelength selection is achieved by means of a local oscillator laser at the ONU, the LE need not be wavelength selective.

An optical line termination (OLT) can be deployed or associated with the LH node. This efficiently requires only a single optical-electrical-optical conversion thereby significantly reducing the amount of equipment required in the network.

As an option, a tree topology of a network with a bi-directional single fiber can be attached to a ring network comprising two unidirectional fibers.

Figure 1:
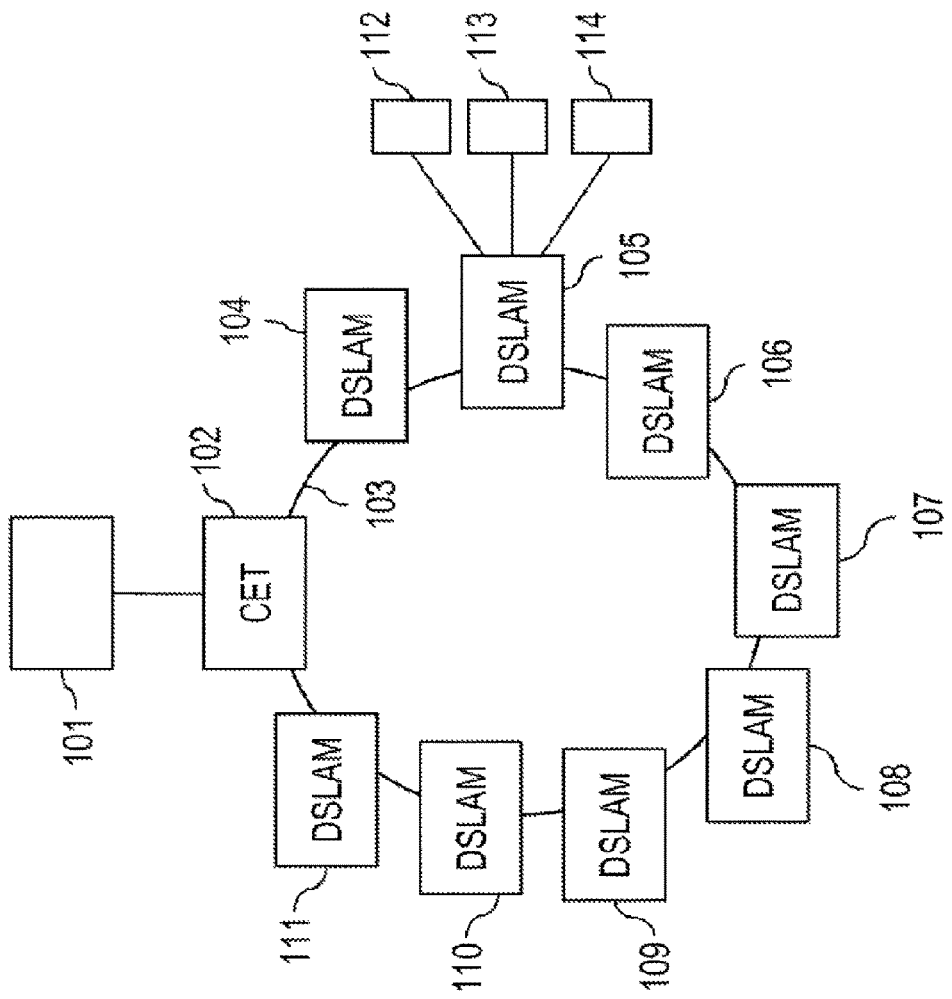
FIG. 1 is a diagram of a prior art network structure.
Figure 2:
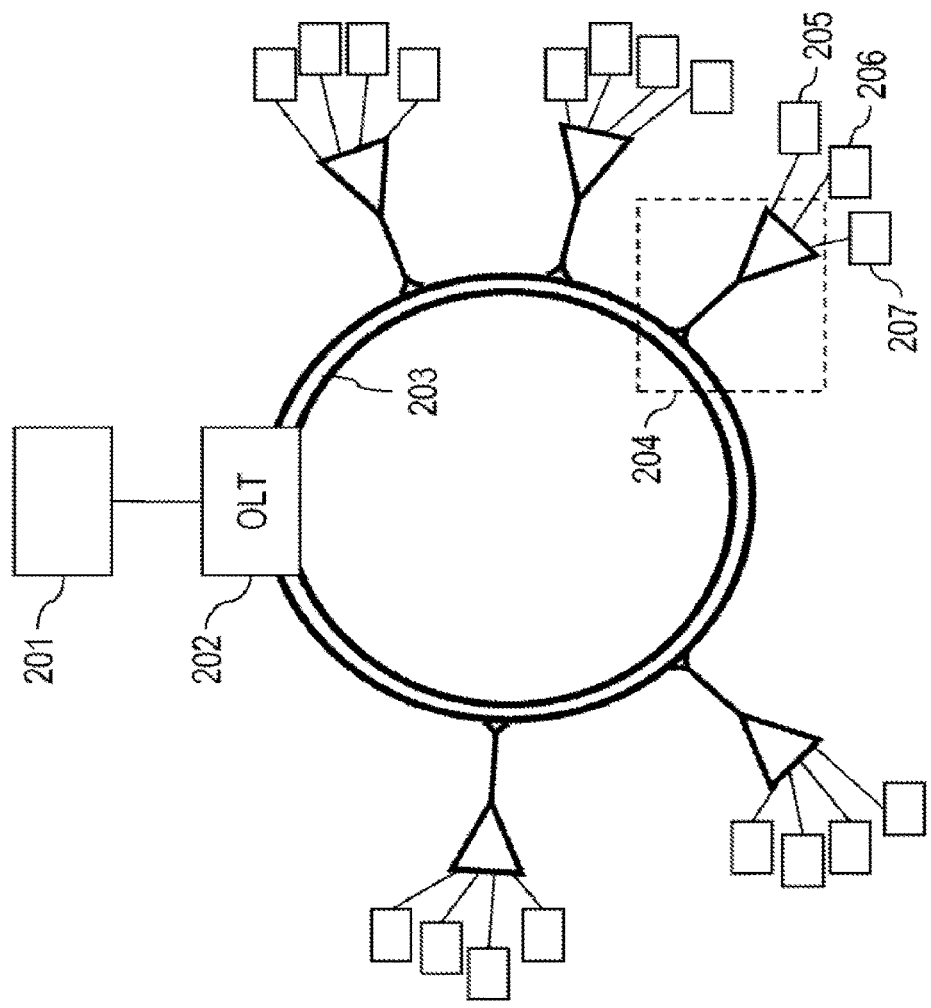
FIG. 2 shows a schematic network architecture comprising an UDWDM PON that is attached via an OLT to a long haul network termination.

FIG. 2 shows a schematic network architecture comprising an UDWDM PON 203 that is attached via an OLT 202 to a long haul network termination 201. The UDWDM PON 203 combines the metro network (ring topology) and the access network (tree topology).

The OLT 202 can be deployed with a central office, which is connected to the long haul network via the long haul network termination 201.

At a local exchange LE 204, traffic is distributed towards subscribers 205 to 207. For redundancy purposes, light that is transmitted (uplink or upstream) from the subscribers can be fed into the ring topology in both directions. In downstream direction, only the working path may be connected in order to avoid interference between signals of the working path and the protection path.

This can be achieved by a controlled or monitored attenuator. Hence, one path can be completely blocked while the other path is open. In case of a fiber cut, monitoring diodes, which could be co-located with the attenuator, detect a loss of power and initiate a local switching to the protection path. This can be achieved without intervention from the OLT.

Such variable attenuators may provide a minimum attenuation at 0 voltage or a maximum attenuation at 0 voltage. In the downstream splitting device, one of each such variable attenuators can be used, so that in the case of a power failure at the LE, only one path can be connected.

Figure 3:
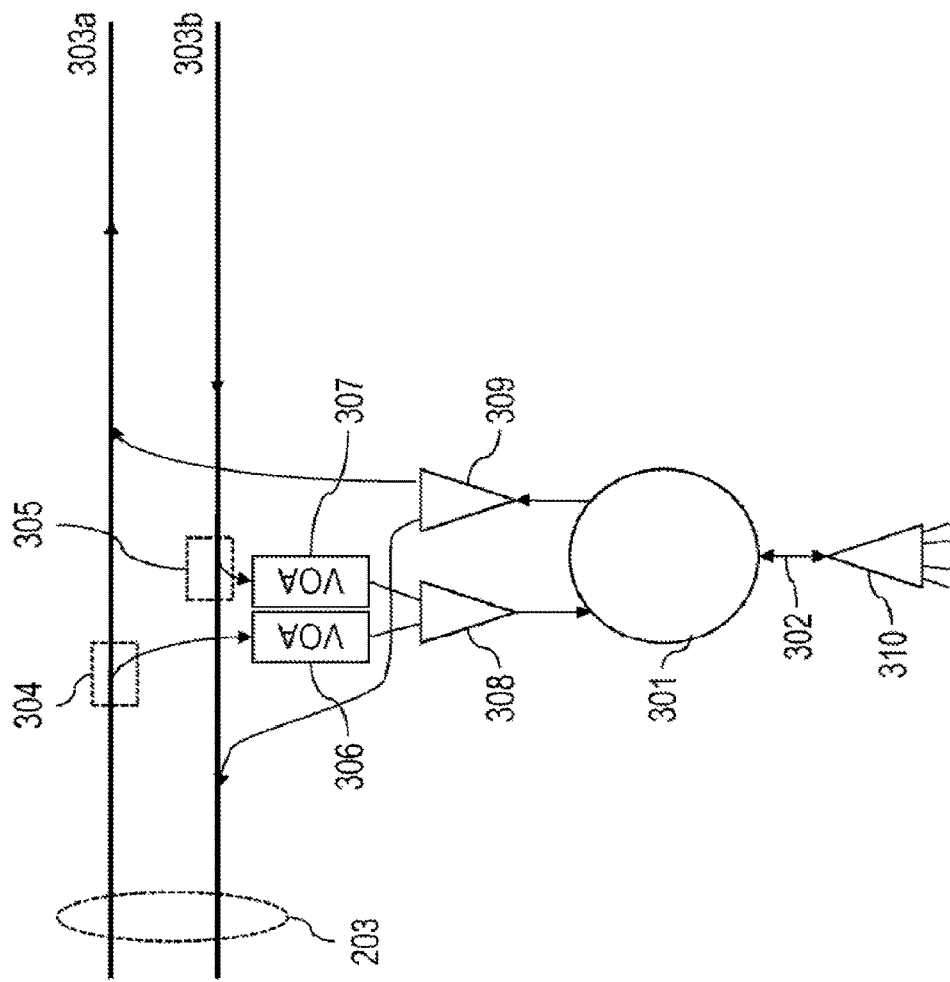
FIG. 3 shows the local exchange of FIG. 2 in more detail in particular comprising a configurable splitter and a two-fiber to one-fiber conversion.

FIG. 3 shows the local exchange 204 of FIG. 2 in more detail in particular comprising a configurable splitter and a two-fiber to one-fiber conversion.

According to FIG. 3, a single fiber topology 302 is converted to a two-fiber topology 303a, 303b of the ring network via a circulator 301.

The ring network comprises two fibers 303a, 303b conveying traffic in opposite directions (fiber 303a conveys traffic from the left hand side to the right hand side).

A coupler 304 (e.g., a passive coupler, a 90/10 splitter or an adjustable coupler) conveys traffic from the fiber 303a of the ring network 203 to a variable optical attenuator VOA 306; a coupler 305 (e.g., a passive coupler, a 90/10 splitter or an adjustable coupler) conveys traffic from the fiber 303b of the ring network 203 to a variable optical attenuator VOA 307. The output signals of the VOAs 306 and 307 are fed to a coupler 308 (e.g., a passive 3 dB coupler or an adjustable coupler) and the output of said coupler is conveyed via the circulator 301 and thus via the single fiber topology 302 to a splitter 310 and further to the subscribers (not shown) attached to this splitter 310. Uplink traffic from such subscribers is conveyed via the splitter 310 and the single fiber topology 302 to the circulator 301 and further to a coupler 309 (e.g., a passive 3 dB coupler or an adjustable coupler), from where it is split and forwarded towards the fibers 303a and 303b.

The LE 204 may use passive broadband splitters to branch off some of the power for its local PON. Therefore the channel power may depend on the location of the LE 204 along the ring network as well as on the direction of the used channel. Hence, channel powers for the working and protection paths may not be equal. If the dynamic range is too high for the receiver, the passive splitters may be replaced by voltage controlled splitters with an adjustable splitting ratio. Hence, the LE 204 can branch off less power from a channel that has experienced little attenuation, and more power from a channel that arrives already significantly weakened at the LE 204. This way, the LE 204 provides a comparable level of light towards its subscribers. Accordingly, the adjustable splitter may feed more power into a channel of longer distance and less power into a channel which will suffer little attenuation. In the upstream direction, this can also be achieved by adjusting the energy-split between the two directions (clockwise or counter-clockwise in the ring network) before the signal is fed into the respective fiber 303a, 303b of the ring network.

The splitting ratio could be configured during installation of the LE 204, e.g., a manually adjustable splitter could be used, or remotely via the OLT 102.

FURTHER ADVANTAGES

The bandwidth usable via the metro ring topology can be significantly increased (e.g., hundreds of GE instead of 8 GE).

A power consumption of the local exchange can be reduced; only VOAs and low-power signal processors for switching purposes are required instead of a DSLAM.

The local exchange does not have to distinguish between frequencies as does the DSLAM with fixed filter cards. The local exchange in this regard is colorless and could thus be used flexibly everywhere in the ring network for every subscriber.

An existing fiber network can be efficiently adapted utilizing the approach presented; for example, an additional fiber may be deployed from the local exchange to the subscriber without any complex adjustments of the network. Hence, also a migration of existing structures to the UDWDM PON approach is simplified.

LIST OF ABBREVIATIONS

CWDM Coarse Wavelength Division Multiplexing
DSL Digital Subscriber Line
DSLAM Digital Subscriber Line Access Multiplexer
DWDM Dense Wavelength Division Multiplexing
GE Gigabit Ethernet
LE Local Exchange
LH Long Haul
NGOA Next Generation Optical Access
OLT Optical Line Termination
ONU Optical Network Unit
PON Passive Optical Network
UDWDM Ultra Dense Wavelength Division Multiplexing
VOA Variable Optical Attenuator
WDM Wavelength Division Multiplexing

The invention claimed is:

1. A local exchange configured to convert downstream traffic conveyed via a two-fiber topology to downstream traffic conveyed via a single-fiber topology, and to convert upstream traffic conveyed via said single-fiber topology to upstream traffic conveyed via said two-fiber topology, wherein said two-fiber topology comprises two unidirectional fibers, wherein the local exchange is not pre-defined to fit a particular wavelength or a selection of wavelengths only, said local exchange comprising:
first and second couplers for coupling with first and second fibers of said two-fiber topology, respectively, said first and second couplers configured to branch-off downstream traffic from respective ones of said first and second fibers,
a third coupler for splitting upstream traffic into a first portion and a second portion,
fourth and fifth couplers for coupling said first and second upstream traffic portions into said first and second fibers, respectively,
wherein said fourth coupler is arranged downstream of said first coupler with regard to the traffic conveyed in said first fiber for coupling with the first fiber, and wherein said fifth coupler is arranged downstream of said second coupler with regard to the traffic conveyed in said second fiber for coupling with the second fiber,
a sixth coupler for coupling downstream traffic branched-off from said first fiber and downstream traffic branched-off from said second fiber into a single fiber, and a circulator, said circulator comprising a first port for receiving the output of the sixth coupler, a second port for outputting a signal from the circulator towards the third coupler, and a third port for outputting signals from the circulator to a single-fiber of said single-fiber topology and for receiving signals from said single-fiber of said single-fiber topology,
one or more controlled optical attenuators for selectively attenuating at least one of the downstream signals branched off from the first fiber or from the second fiber,
wherein said local exchange is adapted to selectively either convey downstream traffic branched off from the first fiber or downstream traffic branched off from the second fiber towards said single-fiber topology, wherein the selection of downstream traffic is made by control of said controlled optical attenuators;
wherein the local exchange is adapted to provide an optical connection between an optical network unit and an optical line termination, and wherein said fourth and fifth couplers are adjustable couplers allowing for adjusting the power levels of the upstream traffic portions fed into the first and second fibers in accordance with a destination of the upstream traffic portions within said two-fiber network.

2. The local exchange of claim 1, wherein at least one of the said first and second couplers is an adjustable coupler.

3. The local exchange of claim 2, wherein said adjustable first and second couplers are controllable such as to branch off an amount of light required for the processing in an access network connected to said single-fiber topology.

4. The local exchange of claim 2, wherein said adjustable first and second couplers are controlled in consideration of the position of the local exchange within said two-fiber topology.

5. The local exchange of claim 1, wherein at least one of said first and second couplers is a passive coupler.

6. The local exchange of claim 1, wherein said at least one controlled optical attenuator comprises a monitoring capability for detecting a loss of light and for initiating a local switching to the respective other of said first and second fibers.

7. The local exchange of claim 1, wherein said fourth and fifth couplers are configured to simultaneously feed said upstream traffic into both of said first and second fibers.

8. The local exchange of claim 1, wherein said third coupler is an adjustable coupler allowing for adjusting the power levels of the upstream traffic portions fed into the first and second fibers.

9. The local exchange of claim 1 wherein said local exchange is configured to couple said two-fiber topology with an access network in the optical domain.

10. The local exchange of claim 1, wherein said two-fiber network is a ring network.

11. The local exchange of claim 10, wherein said ring network is a metro network.

12. In a local exchange, a method of converting downstream traffic conveyed via a two-fiber topology to downstream traffic conveyed via a single-fiber topology, and of converting upstream traffic conveyed via a single-fiber topology to upstream traffic conveyed via said two-fiber topology, wherein said two-fiber topology comprises two unidirectional fibers, wherein the local exchange is not pre-defined to fit a particular wavelength or a selection of wavelengths only, wherein the local exchange is adapted to provide an optical connection between an optical network unit and an optical line termination comprising the following steps:

branching off downstream traffic from one of a first and a second fiber of said two-fiber topology using a respective one of a first and a second coupler provided by a local exchange,
splitting upstream traffic using a third coupler into a first portion and a second portion,
coupling at least one of said first and second portions into a respective one of said first and second fibers using a respective one of a fourth and a fifth coupler, wherein said fourth and fifth couplers are adjustable couplers, and wherein the power of the upstream traffic portions coupled into said first and second fibers are adjusted in accordance with a destination of the upstream traffic portions within said two-fiber network, wherein said fourth coupler is arranged downstream of said first coupler with regard to the traffic conveyed in said first fiber for coupling with the first fiber, and wherein said fifth coupler is arranged downstream of said second coupler with regard to the traffic conveyed in said second fiber for coupling with the second fiber,
coupling downstream traffic branched-off from said first fiber and downstream traffic branched-off from said second fiber into a single-fiber by means of a sixth coupler, receiving the output of the sixth coupler by a first port of a circulator, outputting a signal from the circulator towards the third coupler from a second port of said circulator, outputting signals from a third port of said circulator to a single-fiber of said single-fiber topology and receiving signals from said single-fiber of said single-fiber topology via said third port of said circulator, and
selectively conveying either downstream traffic branched off from the first fiber or downstream traffic branched off from the second fiber towards said single-fiber topology, wherein the selection of downstream traffic is made by control of one or more controlled optical attenuators, wherein each controlled optical attenuator is configured for selectively attenuating at least one of the downstream signals branched off from the first fiber or from the second fiber.

13. The method of claim 12, further comprising a step of monitoring a detection loss of light branched off from one of said first and second fibers, and in response to said detection loss, switching to the respective other of said first and second fibers.

14. The method of claim 13, wherein said first and second upstream traffic portions are simultaneously coupled into both of said first and second fibers.

15. The method of claim 14, wherein said third coupler is an adjustable coupler, and wherein the power of the upstream traffic portions coupled into said first and second fibers are adjusted.

* * * * *